(12) United States Patent
Sasada et al.

(10) Patent No.: US 8,178,597 B2
(45) Date of Patent: *May 15, 2012

(54) AQUEOUS INKJET RECORDING INK AND METHOD FOR PRODUCING THE SAME

(75) Inventors: Misato Sasada, Ashigarakami-gun (JP); Takafumi Hosokawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 421 days.

This patent is subject to a terminal disclaimer.

(21) Appl. No.: 12/367,088

(22) Filed: Feb. 6, 2009

(65) Prior Publication Data

US 2009/0203823 A1   Aug. 13, 2009

(30) Foreign Application Priority Data

Feb. 13, 2008  (JP) ................................. 2008-032168

(51) Int. Cl.
| | | |
|---|---|---|
| A61K 9/16 | (2006.01) | |
| C08F 220/12 | (2006.01) | |
| C08J 3/00 | (2006.01) | |
| C08J 3/09 | (2006.01) | |
| C08K 9/00 | (2006.01) | |
| C08L 31/00 | (2006.01) | |
| C08L 33/00 | (2006.01) | |
| C08L 33/06 | (2006.01) | |
| C09B 67/00 | (2006.01) | |
| C09D 5/00 | (2006.01) | |
| C09D 5/02 | (2006.01) | |
| C09D 11/00 | (2006.01) | |

(52) U.S. Cl. ........ 523/160; 523/161; 523/200; 523/205; 523/206; 523/305; 523/336; 523/339; 524/543; 524/556; 524/560

(58) Field of Classification Search .................. 523/160, 523/161, 200, 205, 206, 305, 336, 339; 524/543, 524/556, 560
See application file for complete search history.

(56) References Cited

U.S. PATENT DOCUMENTS

| | | | |
|---|---|---|---|
| 4,665,107 A | 5/1987 | Micale | |
| 5,049,322 A | 9/1991 | Devissaguet et al. | |
| 6,262,152 B1 | 7/2001 | Fryd et al. | |
| 2005/0090599 A1* | 4/2005 | Spinelli | 524/543 |
| 2009/0203823 A1 | 8/2009 | Sasada et al. | |
| 2009/0203833 A1* | 8/2009 | Sasada et al. | 524/558 |
| 2009/0208652 A1* | 8/2009 | Sasada et al. | 427/261 |
| 2009/0220748 A1* | 9/2009 | Kanaya et al. | 428/195.1 |
| 2009/0239981 A1* | 9/2009 | Morimoto | 524/90 |

FOREIGN PATENT DOCUMENTS

| | | |
|---|---|---|
| EP | 0 274 961 B1 | 7/1988 |
| EP | 1 153 991 A1 | 11/2001 |
| EP | 1 321 495 A1 | 6/2003 |
| EP | 1 621 587 A1 | 2/2006 |
| JP | 3-221137 A | 9/1991 |
| JP | 3301082 B2 | 4/2002 |
| JP | 2005-041994 A | 2/2005 |
| JP | 2006-273891 A | 10/2006 |

OTHER PUBLICATIONS

EP Communication, dated May 19, 2009, issued in corresponding EP Application No. 09152450.4, 6 pages.

* cited by examiner

*Primary Examiner* — Patrick Niland
(74) *Attorney, Agent, or Firm* — Sughrue Mion, PLLC

(57) ABSTRACT

An aqueous inkjet recording ink including pigment particles coated with a water-insoluble resin, water, and a water-soluble organic solvent including at least one hydroxy group, wherein the water-insoluble resin has a salt-forming group and a structural unit which is derived from a methacrylate and has an aromatic ring linked via a linking group to an atom in the main chain of the water-insoluble resin, and the water-insoluble resin satisfies the condition that when the water-insoluble resin, an organic solvent, one equivalent of a neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent.

11 Claims, No Drawings

AQUEOUS INKJET RECORDING INK AND METHOD FOR PRODUCING THE SAME

CROSS-REFERENCE TO RELATED APPLICATION

This application claims priority under 35 USC 119 from Japanese Patent Application No. 2008-032168, the disclosure of which is incorporated by reference herein.

BACKGROUND OF THE INVENTION

1. Field of the Invention

The present invention relates to an aqueous inkjet recording ink and a method for producing the same.

2. Description of the Related Art

As a colorant used in an inkjet recording ink, a pigment is widely used from the view point of resistance to light or resistance to water and the like. For a case in which a pigment is dispersed and used, various studies have been carried out to develop techniques for improving dispersion particle diameter, stability after dispersion, uniformity of dispersion size and the like.

For example, a dispersion method using a surfactant in an emulsified composition state in which a solvent, a polymer and a pigment form a discontinuous phase has been disclosed (for example, see U.S. Pat. No. 4,665,107). According to this method, water forms a continuous phase, and an aqueous dispersion is obtained by removing the solvent after the dispersion step. In addition, a method has been disclosed which comprises adding an aqueous phase comprising a surfactant to a dispersion comprising a polymer, a solvent and a pigment, and removing the solvent to obtain an aqueous dispersion (for example, see European Patent No. 0274961).

Meanwhile, as a method for producing microcapsules, a method has been disclosed in which without using a surfactant, submicron capsules having a gloss developing property are formed by using a self-dispersing resin which can be self-dispersed in a mean particle diameter of 0.1 μm or less under an action of an aqueous medium (for example, see Japanese Patent Application Laid-Open (JP-A) No. 3-221137 and JP Patent No. 3301082).

However, according to the conventional methods which use a surfactant as described above, fine particles cannot be obtained which is required for inkjet ink, and also, due to the use of a surfactant, an unnecessary surfactant is introduced into the ink. In terms of ejection stability, it is preferable that a surfactant is not included in inkjet ink.

In addition, in the method in which a self-dispersing resin is used, there are problems that the particle diameter for inkjet ink, and the dispersion stability of the ink which comprises a water-soluble organic solvent is insufficient.

SUMMARY OF THE INVENTION

According to an aspect of the invention, there is provided an aqueous inkjet recording ink comprising pigment particles coated with a water-insoluble resin, water, and a water-soluble organic solvent comprising at least one hydroxy group, wherein the water-insoluble resin has a salt-forming group and a structural unit which is derived from a methacrylate and has an aromatic ring linked via a linking group to an atom in the main chain of the water-insoluble resin, and the water-insoluble resin satisfies the condition that when the water-insoluble resin, an organic solvent, one equivalent of a neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent.

DETAILED DESCRIPTION OF THE INVENTION

The present invention has been completed based on the findings that, the use of a resin dispersant which is not dissolved in water during dispersion operation and has a property of staying in an organic phase and not being precipitated in an aqueous phase when an organic phase and an aqueous phase start to get separated from each other after dispersion operation can contribute to improvement of dispersion stability, and a resin which can form a soft micelle in an emulsified state can be easily adsorbed onto the surface of a pigment during dispersion operation.

Herein below, the aqueous inkjet recording ink and the method for producing the same of the invention are explained in greater detail.

The aqueous inkjet recording ink of the invention comprises pigment particles coated with a water-insoluble resin, water, a water-soluble organic solvent comprising at least one hydroxy group, and optionally other components such as a surfactant, wherein the water-insoluble resin has a salt-forming group and a structural unit which is derived from a methacrylate and has an aromatic ring linked via a linking group to an atom in the main chain of the water-insoluble resin, and the water-insoluble resin satisfies the following condition A.

Herein below, the water-insoluble resin is sometimes referred to as a "specific water-insoluble resin".

In the invention, by coating a pigment used as a colorant with a specific water-insoluble resin and dispersing it in an ink liquid, fine pigment particles can be provided, and high dispersion stability can be obtained after dispersion.

Herein below, each component included in the aqueous inkjet recording ink of the invention will be explained in greater detail.

—Resin-Coated Pigment Particles—

The aqueous inkjet recording ink of the invention comprises at least one kind of pigment particles coated with a water-insoluble resin (i.e., a "specific water-insoluble resin") satisfying the following condition A and having a salt-forming group and a structural unit which is derived from a methacrylate and has an aromatic ring linked via a linking group to an atom in the main chain of the water-insoluble resin. The surfaces of the resin-coated pigment particles are not necessarily entirely coated with a specific water-insoluble resin, and may be partially coated with a specific water-insoluble resin.

The pigment contained in the aqueous inkjet recording ink of the invention is a pigment encapsulated in a specific water-insoluble resin, i.e., a polymer emulsion which includes pigment particles in polymer particles. More specifically, The pigment is coated with a water-insoluble resin to form a resin layer on the surface of the pigment, and is dispersed in water.

<Specific Water-Insoluble Resin>

The specific water-insoluble resin according to the invention at least comprises a salt-forming group and a structural unit which is derived from a methacrylate and has an aromatic ring linked via a linking group to an atom in the main chain of the water-insoluble resin (herein below, sometimes referred to as a "specific structural unit derived from a methacrylate"), and satisfies the following condition A.

Condition A: when the specific water-insoluble resin, an organic solvent, one equivalent of a neutralizing agent (for example, when the salt-forming group is anionic, the neutralizing agent may be sodium hydroxide, and when the salt-forming group is cationic, the neutralizing agent may be acetic acid.) with respect to the salt-forming group, and water are mixed with a total content of the specific water-insoluble resin and the organic solvent being 35% by mass relative to the total mass of the mixture, an emulsion is formed without precipitation of the specific water-insoluble resin, and after the emulsion is allowed to stand for three hours, a transparent single phase is formed, or two separate phases are formed and at least an aqueous phase of the two phases is transparent.

The term "emulsion" indicates an emulsified state in which the specific water-insoluble resin is dispersed in a liquid state in water. The term "transparent" used in the wording "an aqueous phase is transparent" indicates a property that the amount of the light which has passed through an aqueous phase having a thickness of 1 cm is at least 85% of the amount of the incident light.

The water-insoluble resin is a resin which has a solubility of 1 g or less in water, when it is completely (100%) neutralized with sodium hydroxide or acetic acid according to the type of the salt-forming group of the specific water-insoluble resin, dried at 105° C. for 2 hours and then dissolved in 100 g of water at 25° C.

Since the specific water-insoluble resin according to the invention has a specific structural unit derived from a methacrylate, the pigment can easily be finely dispersed. In addition, since the specific water-insoluble resin according to the invention satisfies the condition A, in a mixed phase of an organic solvent and water, no precipitation is formed and a fine emulsion, for example with a size of 100 nm or less, is formed during a mixing process such as stirring. However, immediately after the mixing process is stopped, separation of an organic phase and an aqueous phase starts to occur and the resin dispersant which is not dissolved in water tends not to precipitate in an aqueous phase. Thus, by dispersing a pigment with the specific water-insoluble resin, a pigment ink excellent in stability can be obtained. In this case, since the specific water-insoluble resin forms a soft micelle in an emulsified state, the resin can be easily adsorbed onto the surface of the pigment during the mixing (dispersing) process, and therefore a dispersion having excellent stability can be obtained. Accordingly, viscosity increase in dispersion state is inhibited.

<Salt-Forming Group>

The salt-forming group is a hydrophilic group. In terms of stability of an emulsion or dispersion state, it is preferably a dissociating group. Examples of a dissociating group include a carboxyl group, a sulfonic acid group, a sulfuric acid group, a phosphoric acid group, a nitric acid group, an amino group, an ammonium group and the like. In the invention, in terms of dispersion stability when aqueous ink is formed, an anionic dissociating group is preferred as a salt-forming group. More preferably, it is a carboxyl group.

<Specific Structural Unit Derived from Methacrylate>

The specific water-insoluble resin according to the invention has at least one "structural unit which is derived from a methacrylate and has an aromatic ring linked via a linking group to an atom in the main chain of the water-insoluble resin (i.e., "specific structural unit derived from a methacrylate")" as a hydrophobic structural unit. In this structural unit, the aromatic ring is linked via a linking group to an atom in the main chain of the water-insoluble resin, so that the aromatic ring is linked to the main chain of the specific water-insoluble resin via a linking group which may comprise an ester group. As a result, since the aromatic ring is not directly linked to the main chain, an appropriate distance is maintained between the hydrophobic aromatic ring and the hydrophilic structural unit, and an interaction between the water-insoluble resin and the pigment can easily occur (strong adsorption), and the dispersibility can be improved.

Ratio of the aromatic ring, which is linked via a linking group to an atom in the main chain of the specific water-insoluble resin, is preferably 15 to 27% by mass in one molecule of the specific water-insoluble resin. More preferably, it is 15 to 20% by mass.

In addition, the content ratio of the specific structural unit derived from a methacrylate in the specific water-insoluble resin is preferably 40% by mass or more but less than 75% by mass with respect to the total mass of the specific water-insoluble resin of the invention, in terms of dispersion stability, ejection stability, and cleaning property of the pigment. More preferably it is 40% by mass or more but less than 70% by mass. More particularly preferably, it is 40% by mass or more but less than 60% by mass.

The "structural unit which is derived from a methacrylate and has an aromatic ring linked via a linking group to an atom in the main chain of the water-insoluble resin" is preferably represented by the following Formula (I).

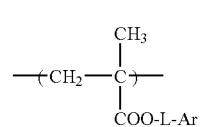

Formula (I)

In the Formula (I), L is a single bond or a divalent linking group having 1 to 30 carbon atoms and when it is a divalent linking group, it is preferably a linking group having 1 to 25 carbon atoms, more preferably a linking group having 1 to 20 carbon atoms, and still more preferably a linking group having 1 to 15 carbon atoms.

Among them, particularly preferred are an alkyleneoxy group having 1 to 25 carbon atoms (more preferably 2 to 12 carbon atoms), an imino group (—NH—), a sulfamoyl group, a divalent linking group having an alkylene group such as an alkylene group having 1 to 20 carbon atoms (more preferably 1 to 10 carbon atoms) or an ethylene oxide group [—$(CH_2CH_2O)_n$—, n=1-6], and a group in which two or more of the above groups are combined.

In the Formula (I), Ar represents a monovalent group derived from an aromatic ring.

The aromatic ring that is represented by Ar may be unsubstituted or substituted. Examples of the aromatic ring that is represented by Ar include a benzene ring, a condensed aromatic ring having 8 or more carbon atoms, an aromatic ring in which a heterocycle is condensed, two or more benzene rings that are connected to each other and the like, but are not specifically limited thereto.

When the aromatic ring is substituted, examples of a substituent include a halogen atom, an alkyl group, an alkoxy group, a hydroxy group, a cyano group and the like. For example, when a benzene ring is substituted, the substituent may form a condensed ring.

The "condensed aromatic ring having 8 or more carbon atoms" is an aromatic ring having 8 or more carbon atoms in which two or more benzene rings are condensed, or an aromatic ring having 8 or more carbon atoms in which at least one aromatic ring and an alicyclic hydrocarbon condensed with the aromatic ring are included. Specific examples include naphthalene, anthracene, fluorene, phenanthrene, acenaphthene and the like.

The "aromatic ring in which a heterocycle is condensed" is derived from a compound wherein an aromatic compound not containing any hetero atom (preferably benzene) and a cyclic compound containing a hetero atom are condensed. Herein, the cyclic compound containing a hetero atom is preferably 5- or 6-membered cyclic compound. As a hetero atom, a nitrogen atom, an oxygen atom or a sulfur atom is preferred. The cyclic compound containing a hetero atom may comprise more than one hetero atom. In this case, the hetero atoms can be the same or different from each other. Specific examples of an aromatic ring in which a heterocycle is condensed include phthalimide, acridone, carbazole, benzoxazole, benzothiazole and the like.

Among the structural units that are represented by the Formula (I), a structural unit in which L is a divalent linking group having 1 to 25 carbon atoms and containing an alkyleneoxy group and/or an alkylene group and Ar is a benzene ring either unsubstituted or substituted is preferred. A structural unit in which L is *—$(CH_2—CH_2—O)_n$— (n represents an average repeating number and n=1 to 6) and Ar is a phenyl group is more preferred.

In addition, the symbol * for L represents a position linked to the main chain side. n is an average repeating number of the ethyleneoxy chain that is contained in the specific water-insoluble resin coated on pigment particles contained in the aqueous inkjet recording ink.

Herein below, specific examples of a monomer which can form a "structural unit which is derived from a methacrylate and has an aromatic ring linked via a linking group to an atom in the main chain of the water-insoluble resin" are given. However, according to the invention, it is not limited to the following specific examples.

M-1

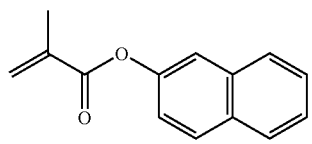

M-2

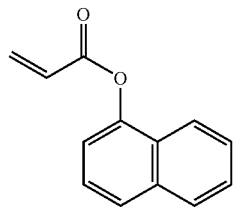

M-3

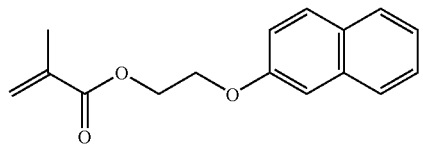

M-4

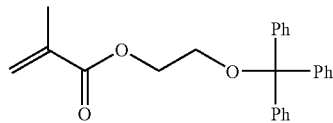

M-5

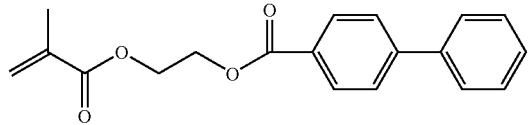

M-6

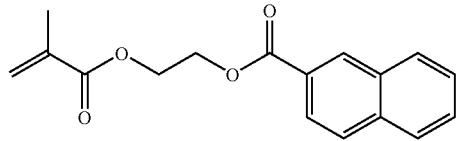

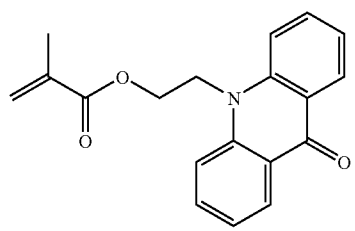
M-7
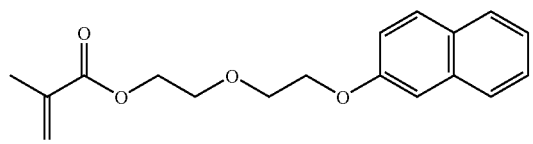
M-8
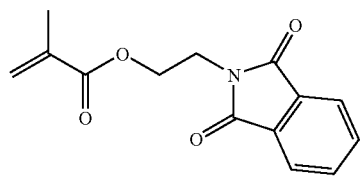
M-9
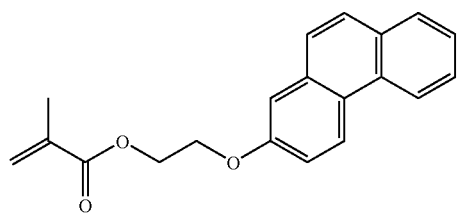
M-10
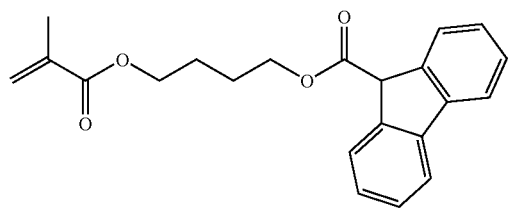
M-11
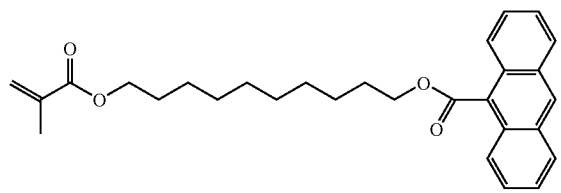
M-12
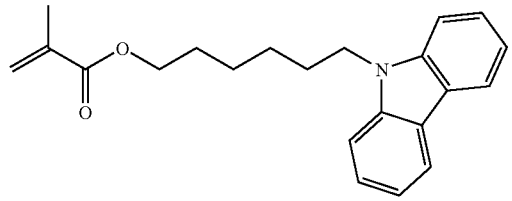
M-13

M-14
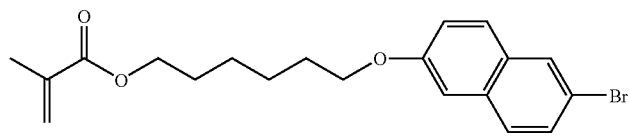
M-15
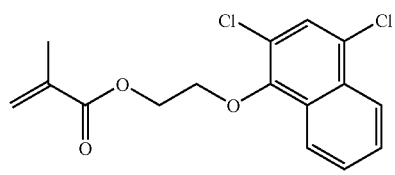
M-16
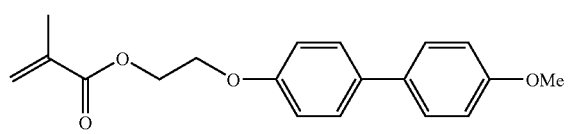
M-17
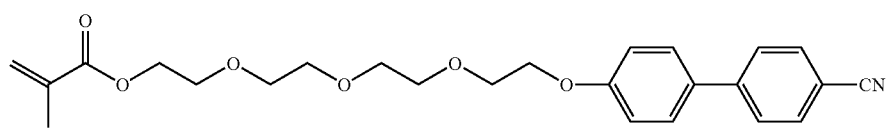
M-18
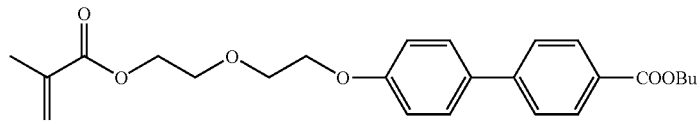
M-19
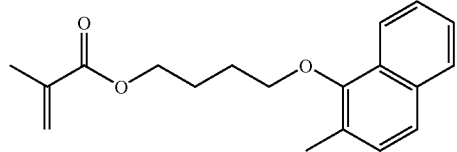
M-20
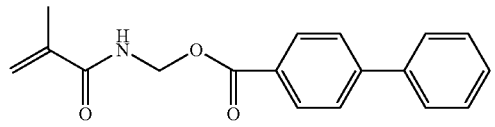
M-21
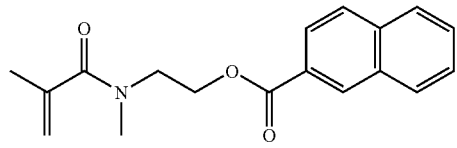
M-22
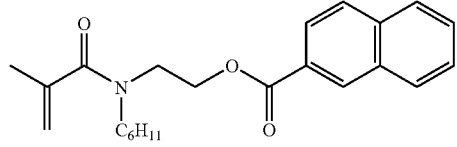

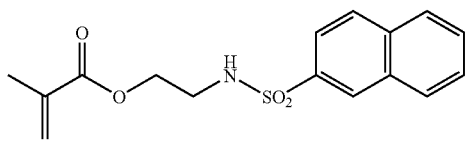

M-23

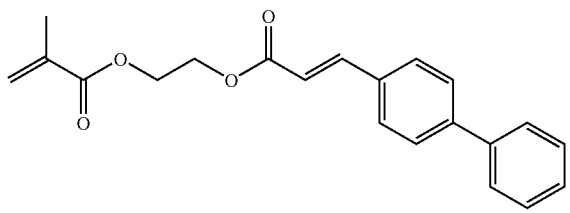

M-24

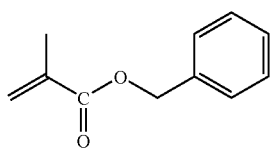

M-25

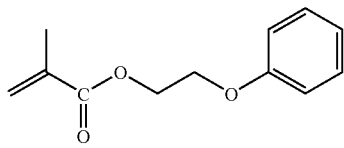

M-26

Among the structural units represented by the Formula (I), in terms of dispersion stability, a structural unit derived from benzyl methacrylate and/or a structural unit derived from phenoxyethyl methacrylate are preferable. The content of a structural unit derived from benzyl methacrylate and/or a structural unit derived from phenoxyethyl methacrylate is preferably 40% by mass or more, and more preferably 40 to 60% by mass in total, in terms of obtaining further improvement of dispersion stability.

The specific water-insoluble resin of the invention is preferably a resin comprising hydrophilic structural units (a) and hydrophobic structural units (b), in terms of easy adsorption onto the surface of the pigment particle and obtainment of dispersion stability. In addition, if necessary, the specific water-insoluble resin may further comprise a structural unit other than the hydrophilic structural units (a) and hydrophobic structural units (b).

<Hydrophilic Structural Units (a)>

The hydrophilic structural units (a) are not specifically limited as long as they are derived from a monomer having a hydrophilic group. Those derived from a monomer having one kind of a hydrophilic group or a monomer having two or more kinds of a hydrophilic group can be used. Examples of the hydrophilic group include a dissociating group or a non-ionic hydrophilic group, but are not specifically limited thereto.

The hydrophilic structural units (a) include a structural unit having the salt-forming group. The salt-forming group can be introduced to the specific water-insoluble resin of the invention by using a monomer having a dissociating group as a salt-forming group (monomer having a dissociating group).

The dissociating group is preferred in terms of stability in emulsified or dispersed state. As a dissociating group, a carboxyl group, a phosphoric acid group, a sulfonic acid group and the like can be mentioned. Among them, in terms of dispersion stability of aqueous inkjet recording ink, a carboxyl group is preferred.

As the monomer having a hydrophilic group, a monomer having a dissociating group is preferred. More preferred is a monomer having a dissociating group and an ethylenic unsaturated bond. Examples of a monomer having a dissociating group include unsaturated carboxylic acid monomer, unsaturated sulfonic acid monomer, unsaturated phosphoric acid monomer and the like.

Examples of the unsaturated carboxylic acid monomer include acrylic acid, methacrylic acid, crotonic acid, itaconic acid, maleic acid, fumaric acid, citraconic acid, 2-methacryloyloxymethyl succinic acid, and the like. Examples of the unsaturated sulfonic acid monomer include styrene sulfonic acid, 2-acylamide-2-methylpropane sulfonic acid, 3-sulfopropyl(meth)acrylate, bis-(3-sulfopropyl)-itaconic acid ester and the like. Examples of the unsaturated phosphoric acid monomer include vinyl phosphonic acid, vinyl phosphate, bis(methacryloxyethyl)phosphate, diphenyl-2-acryloyloxyethylphosphate, diphenyl-2-methacryloyloxyethylphosphate, dibutyl-2-acryloyloxyethylphosphate and the like.

Among the monomers having a dissociating group, in terms of dispersion stability and ejection stability, unsaturated carboxylic acid monomer is preferred. Acrylic acid and methacrylic acid are more preferred.

In addition, a structural unit derived from a monomer having a non-ionic hydrophilic group can be used as a hydrophilic structural unit (a). Examples thereof include (meth)acrylates and (meth)acylamides having a hydrophilic functional group and vinyl monomers such as vinylesters having a hydrophilic functional group.

Examples of the "hydrophilic functional group" include a hydroxy group, an amino group, an amide group (nitrogen atom is unsubstituted) and alkylene oxides such as polyethylene oxide and polypropylene oxide as described below.

The monomer which forms a hydrophilic structural unit having a non-ionic hydrophilic group is not specifically limited as long as it comprises a functional group such as an ethylenic unsaturated bond which can form a polymer and a non-ionic hydrophilic functional group, and it can be selected from known monomers. Specific examples thereof preferably include hydroxyethyl(meth)acrylate, hydroxybutyl(meth)acrylate, (meth)acrylamide, aminoethyl acrylate, aminopropyl acrylate, and (meth)acrylate containing an alkylene oxide polymer.

The hydrophilic structural unit having a non-ionic hydrophilic group can be formed by polymerization of a corresponding monomer. Alternatively, hydrophilic functional groups can be introduced to the polymer chain after obtaining it by polymerization.

As a hydrophilic structural unit having a non-ionic hydrophilic group, a hydrophilic structural unit having an alkylene oxide structure is more preferred. As the alkylene moiety in an alkylene oxide structure, an alkylene moiety having 1 to 6 carbon atoms is preferred, an alkylene moiety having 2 to 6 carbon atoms is more preferred, and an alkylene moiety having 2 to 4 carbon atoms is particularly more preferred, in terms of hydrophilicity. In addition, the polymerization degree of the alkylene oxide structure is preferably 1 to 120, more preferably 1 to 60 and particularly more preferably 1 to 30.

In addition, as a hydrophilic structural unit having a non-ionic hydrophilic group, a hydrophilic structural unit having a hydroxy group is also preferred. The number of a hydroxy group contained in a structural unit, in terms of hydrophilicity of the water-insoluble resin and compatibility with other monomers and solvent used during polymerization, is preferably 1 to 4, more preferably 1 to 3, and particularly preferably 1 to 2, but not specifically limited thereto.

Content ratio of hydrophilic structural units varies depending on the ratio of the hydrophobic structural units (b) described below. For example, when the water-insoluble resin consists of acrylic acid and/or methacrylic acid [hydrophilic structural units (a)] and the hydrophobic structural units (b) described below, the content ratio of acrylic acid and/or methacrylic acid is calculated by "100–(% by mass of the hydrophobic structural units)".

The hydrophilic structural units (a) can be used alone or in combination of two or more.

<Hydrophobic Structural Units (b)>

The specific water-insoluble resin in the invention may further comprise a hydrophobic structural unit (b) other than the "structural unit which is derived from a methacrylate and has an aromatic ring linked via a linking group to an atom in the main chain of the water-insoluble resin".

Examples of such a hydrophobic structural unit (b) include a structural unit that does not belong to the hydrophilic structural units (a) (i.e., that has no hydrophilic functional group) such as structural units derived from (meth)acrylamides, vinyl monomers such vinyl esters, or (meth)acrylates such as (C1 to C4)alkyl(meth)acrylates. These structural units can be used alone or in combination of two or more.

Examples of the (meth)acrylamides include (meth)acrylamides such as N-cyclohexyl(meth)acrylamide, N-(2-methoxyethyl)(meth)acrylamide, N,N-diallyl(meth)acrylamide, and N-allyl(meth)acrylamide.

Examples of the vinyl esters include vinyl esters such as vinyl acetate, vinyl chloroacetate, vinyl propionate, vinyl butyrate, vinyl methoxyacetate and vinyl benzoate. Among them, vinyl acetate is preferred.

Examples of the (meth)acrylates include methyl(meth)acrylate, ethyl(meth)acrylate, (iso)propyl(meth)acrylate, (iso or tertiary)butyl(meth)acrylate.

Among those described in the above, in terms of dispersion stability, (C1 to C4)alkyl(meth)acrylates are preferred. When a structural unit derived from a (C1 to C4)alkyl(meth)acrylate is contained, the content ratio is preferably 15% by mass or more, more preferably 20% by mass or more but 60% by mass or less, and still more preferably 20% by mass or more but 50% by mass or less, in terms of dispersion stability.

Although the composition ratios of the hydrophilic structural units (a) and the hydrophobic structural units (b) varies depending on hydrophilicity and hydrophobicity of each units, the content ratio of the hydrophobic structural units (b) with respect to the total mass of the specific water-insoluble resin is preferably more than 80% by mass, and more preferably more than 85% by mass. In other words, the content ratio of the hydrophilic structural units (a) is preferably 15% by mass or less with respect to the total mass of the specific water-insoluble resin. When the hydrophilic structural units (a) are contained in an amount of 15% by mass or less, the amount of the component that is dissolved by itself in an aqueous liquid medium instead of contributing to the dispersion of the pigment can be reduced, favorable dispersion state of the pigment can be maintained, and viscosity increase can be inhibited. As a result, when the inkjet recording ink is prepared using them, ejection property can be improved.

Acid number of the specific water-insoluble resin of the invention is preferably 30 mgKOH/g or more but 100 mgKOH/g or less, in terms of dispersibility of the pigment and storage stability. More preferably, it is 30 mgKOH/g or more but 85 mgKOH/g or less. Particularly more preferably, it is 50 mgKOH/g or more but 85 mgKOH/g or less.

In addition, the acid number is defined as the mass (mg) of KOH that is required for complete neutralization of 1 g of the specific water-insoluble resin and is measured by the method according to JIS Standard (JIS K0070, 1992), the disclosure of which is incorporated by reference herein.

The weight average molecular weight (Mw) of the specific water-insoluble resin of the invention is preferably 30,000 or more, more preferably 30,000 to 150,000, still more preferably 30,000 to 100,000 and particularly more preferably 30,000 to 80,000. When the molecular weight is 30,000 or more, steric repulsive effect of the dispersant tends to be improved, and due to such steric effect, adsorption onto the pigment can be improved.

In addition, the number average molecular weight (Mn) is preferably in the range of 1,000 to 100,000, and particularly more preferably in the range of 3,000 to 50,000. When the number average molecular weight falls within the above range, function of the resin as a coating layer on the pigment or an ink coating layer can be obtained. In the invention, the specific water-insoluble resin is preferably used in a form of a salt of an alkaline metal or an organic amine.

In addition, the molecular weight distribution of the specific water-insoluble resin of the invention (weight average molecular weight/number average molecular weight) is preferably in the range of 1 to 6, and more preferably in the range of 1 to 4. When the molecular weight distribution falls within the above range, dispersion stability and ejection stability of ink can be improved.

The number average molecular weight and weight average molecular weight are obtained by measurement with a differential refractometer (solvent; THF) based on GPC analytical apparatus using TSKgel GMHxL, TSKgel G4000HxL, and TSKgel G2000HxL columns (all manufactured by Tosoh Corp.) and conversion of the obtained value in view of polystyrene as a standard material.

The specific water-insoluble resin of the invention can be polymerized according to various methods such as solution polymerization, precipitation polymerization, suspension polymerization, precipitation polymerization, bulk polymerization, and emulsion polymerization. The polymerization reaction can be carried out according to a known operational process such as batch process, semi-continuous process, continuous process and the like. A method for initiating polymerization may be a method using a radical initiator, a method using light or radiation and the like. These methods for polymerization and method for initiating polymerization are described in literatures; for example "Method for polymer synthesis" (revised edition, Tsruda Teiji, 1971, Nikkan Kogyo Shimbun) or "Experimental method for polymer synthesis" (Ohtsu Takayuki and Kishita Masayoshi, 1972, Kagaku Dojin, pp 124 to 154).

Specifically, the specific water-insoluble resin can be produced by copolymerization of a mixture comprising a monomer mixture, and if necessary a radical initiator and an organic solvent under the atmosphere of inert gas. Among the polymerization methods, a solution polymerization using a radical initiator is particularly preferred.

Examples of a solvent which can be used for a solution polymerization include various organic solvents such as ethyl acetate, butyl acetate, acetone, methylethyl ketone, methylisobutyl ketone, cyclohexanone, tetrahydrofuran, dioxane, N,N-dimethylforrnamide, N,N-dimethylacetamide, benzene, toluene, acetonitrile, methylene chloride, chloroform, dichloroethane, methanol, ethanol, 1-propanol, 2-propanol, and 1-butanol. The solvent can be used alone or in combination of two or more. In addition, it can be used as a mixed solvent with water. It is necessary to set the temperature for polymerization considering molecular weight of a polymer to be produced, and types of an initiator and the like. In general, it is approximately 0° C. to 100° C. Preferably, the polymerization is carried out under the temperature range of 50 to 100° C. The reaction pressure can be appropriately selected and it is generally 1 to 100 kg/cm$^2$, and particularly preferred is 1 to 30 kg/cm$^2$. The reaction time is approximately 5 to 30 hours. The resin produced can be further purified by re-precipitation and the like.

Herein below, specific examples of a preferred specific water-insoluble resin of the invention are described. However, it is not limited thereto in the invention.

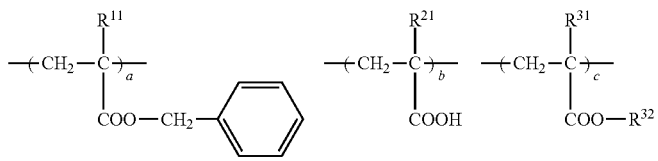

(a, b and c each represent the composition ratio of the unit (% by mass).)

|     | $R^{11}$ | $R^{21}$ | $R^{31}$ | $R^{32}$ | a | b | c | Mw |
|-----|----------|----------|----------|----------|-----|-----|-----|-------|
| B-1 | CH$_3$ | CH$_3$ | CH$_3$ | —CH$_3$ | 60 | 10 | 30 | 46000 |
| B-2 | CH$_3$ | CH$_3$ | CH$_3$ | —CH$_2$CH$_3$ | 61 | 10 | 29 | 43000 |
| B-3 | CH$_3$ | CH$_3$ | CH$_3$ | —CH$_2$CH$_2$CH$_2$CH$_3$ | 61 | 9 | 30 | 51000 |
| B-4 | CH$_3$ | CH$_3$ | CH$_3$ | —CH$_2$(CH$_3$)CH$_3$ | 60 | 9 | 31 | 96000 |
| B-5 | CH$_3$ | CH$_3$ | CH$_3$ | —CH$_2$CH(CH$_3$)CH$_3$ | 60 | 5 | 35 | 75000 |

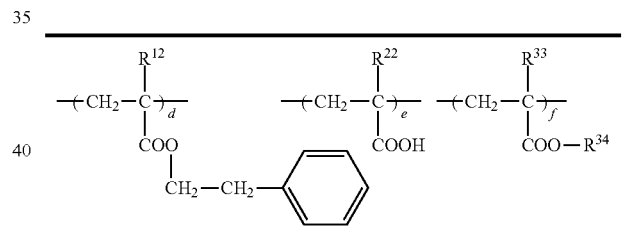

(d, e and f each represent the composition ratio of the unit (% by mass).)

|     | $R^{12}$ | $R^{22}$ | $R^{33}$ | $R^{34}$ | d | e | f | Mw |
|-----|----------|----------|----------|----------|-----|-----|-----|-------|
| B-6 | CH$_3$ | CH$_3$ | CH$_3$ | —CH$_3$ | 55 | 12 | 33 | 31000 |

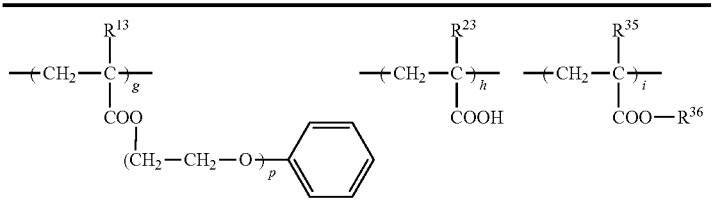

(g, h and i each represent the composition ratio of the unit (% by mass).)

|     | $R^{13}$ | p | $R^{23}$ | $R^{35}$ | $R^{36}$ | g | h | i | Mw |
|-----|----------|---|----------|----------|----------|-----|-----|-----|-------|
| B-7 | CH$_3$ | 1 | CH$_3$ | CH$_3$ | —CH$_3$ | 60 | 9 | 31 | 35500 |
| B-8 | CH$_3$ | 2 | CH$_3$ | CH$_3$ | —CH$_3$ | 70 | 11 | 19 | 68000 |
| B-9 | CH$_3$ | 4 | CH$_3$ | CH$_3$ | —CH$_2$(CH$_3$)CH$_3$ | 70 | 7 | 23 | 72000 |

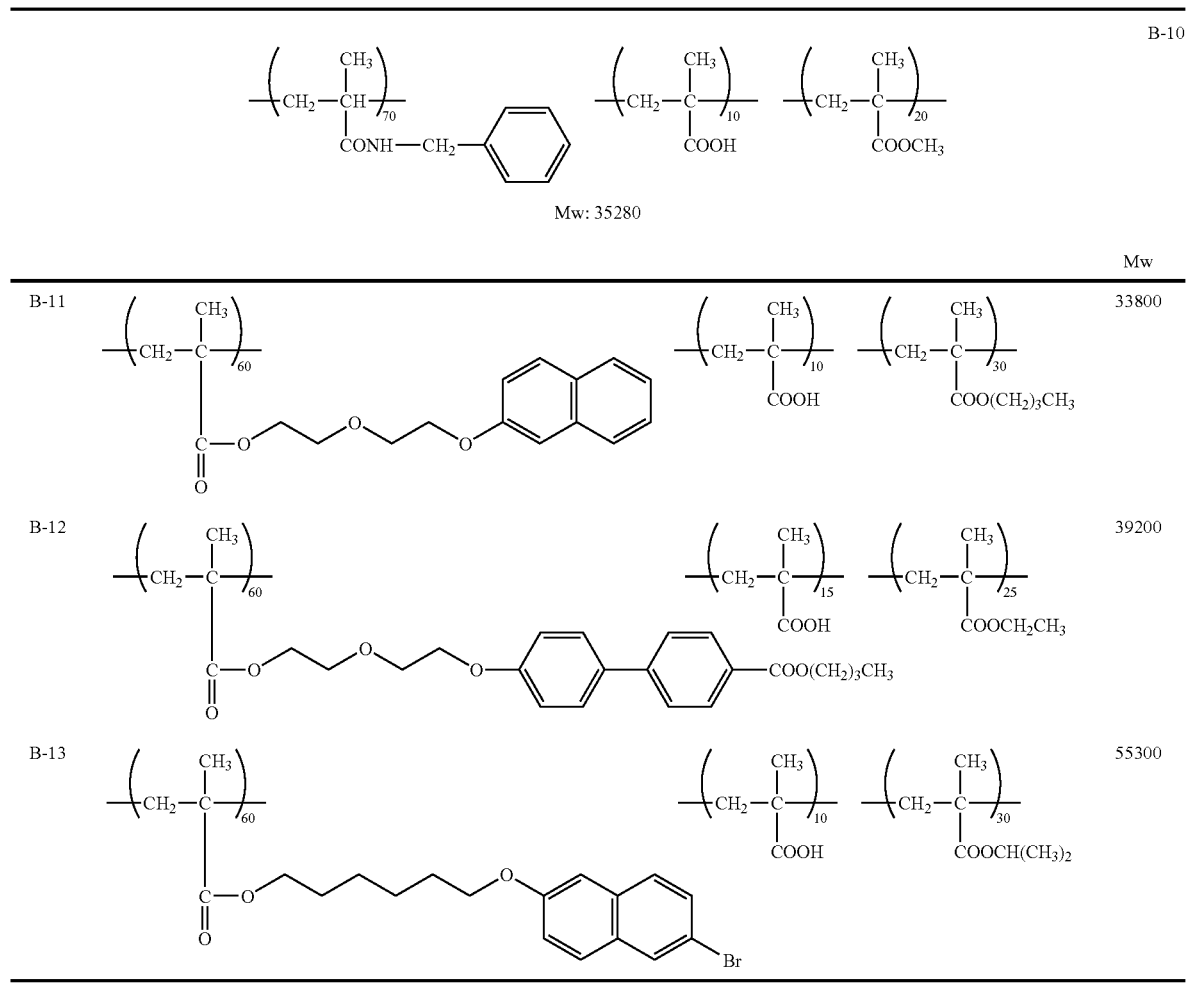

<Pigment>

Next, the pigment that is coated with the specific water-insoluble resin according to the invention will be explained.

Without being specifically limited, the pigment can be appropriately selected depending on the purpose, and it can be any one of an organic pigment and an inorganic pigment, for example.

Examples of the organic pigment include azo pigment, polycyclic pigment, dye chelate, nitro pigment, nitroso pigment, aniline black and the like. Among them, azo pigment and polycyclic pigment are more preferred.

Examples of the azo pigment include azo lake, insoluble azo pigment, condensed azo pigment, chelate azo pigment and the like.

Examples of the polycyclic pigment include phthalocyanine pigment, perylene pigment, perinone pigment, anthraquinone pigment, quinacridone pigment, dioxazine pigment, indigo pigment, thioindigo pigment, isoindolinone pigment, quinophthalone pigment and the like.

Examples of the dye chelate include basic dye chelate, acidic dye chelate and the like.

As the organic pigment, examples of pigment for yellow ink include C. I. Pigment·Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180 and the like.

Examples of pigment for magenta ink include C. I. Pigment·Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 and the like and C. I. Pigment·Violet 19. In particular, C. I. Pigment·Red 122 is preferred.

Further, examples of pigment for cyan ink include C. I. Pigment·Blue 1, 2, 3, 15, 15:1, 15:2, 15:3, 15:34, 16, 17:1, 22, 25, 56, 60, C. I. Vat blue 4, 60, 63 and the like. In particular, C. I. Pigment·Blue 15:3 is preferred.

Examples of the inorganic pigment include titanium oxide, iron oxide, calcium carbonate, barium sulfate, aluminum hydroxide, barium yellow, cadmium red, chrome yellow, carbon black and the like. Among them, carbon black is particularly preferred. In addition, examples of carbon black include those produced by conventional methods such as contact method, furnace method, and thermal method.

With respect to black color pigment, specific examples of carbon black include Raven7000, Raven5750, Raven5250, Raven5000 ULTRAII, Raven 3500, Raven2000, Raven1500, Raven1250, Raven1200, Raven1190 ULRTAII, Raven1170, Raven1255, Raven1080, Raven1060, Raven700 (all manufactured by Colombian·Carbon Corp.), Regal400R, Regal330R, Regal660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corp.), Color Black FW1, Color Black FW2, Color Black FW2V, Color Black 18, Color Black FW200, Color Black S150, Color Black S160, Color Black S170, Printex35, Printex U, Printex V, Printex140U, Printex140V, Special Black 6, Special Black 5, Special Black 4A, Special Black 4 (all manufactured by Degussa), No. 25, No. 33, No. 40, No. 45, No. 47, No. 52, No. 900, No. 2200B, No. 2300, MCF-88, MA600, MA7, MA8, MA100 (all manufactured by Mitsubishi Chemical Corp.) and the like, but not limited thereto.

Pigments can be used alone in single type or in combination of two or more types, which may be selected from the single group or different groups listed above.

The mass ratio between the pigment (p) and the specific water-insoluble resin (r) according to the invention (i.e., p:r) is preferably 100:25 to 100:140. More preferably, it is 100:25 to 100:50. When the above ratio (p:r) is 100:25 or more, dispersion stability and wear resistance tend to be improved. When the above ratio (p:r) is 100:140 or less, dispersion stability tends to be improved.

The resin-coated pigment of the invention (microcapsulated pigment) can be produced according to conventional physical and chemical methods using a specific water-insoluble resin and pigment, etc. For example, it can be produced according to the methods described in JP-A Nos. 9-151342, 10-140065, 11-209672, 11-172180, 10-25440 or 11-43636. Specifically, the phase inversion method and the acid precipitation method and the like that have been disclosed in JP-A Nos. 9-151342 and 10-140065 can be mentioned. Among them, in terms of dispersion stability, the phase inversion method is preferred.

a) Phase Inversion Method

Phase invention method is basically a self-dispersing (phase inversion emulsification) method which comprises dispersing a mixed molten material including a resin having self-dispersing ability or solubility and a pigment. The mixed molten material may comprise the hardening agent or polymer compound. The mixed molten material indicates a material having a state of being mixed but not dissolved, a state of being mixed and dissolved, or both the two states. Examples of more specific phase inversion method include those described in JP-A No. 10-140065.

b) Acid Precipitation Method

Acid precipitation method comprises steps of preparing a hydrous cake comprising a pigment and a resin, neutralizing a part of or the whole anionic groups contained in the resin in the hydrous cake by using a basic compound to produce a microcapsulated pigment.

Specifically, there are acid precipitation methods which comprise steps of (1) dispersing the pigment and the resin in an alkaline aqueous medium, and optionally performing heat treatment for gelling of the resin, (2) adjusting the pH to neutral or acidic value to make the resin hydrophobic, and therefore strongly fixing the resin to the pigment, (3) obtaining a hydrous cake, if necessary by filtration and washing with water, (4) neutralizing a part of or the whole anionic groups contained in the resin in the hydrous cake by using a basic compound, and thereafter re-dispersing the resin in an aqueous medium, and (5) if necessary, carrying out the heat treatment for gelling of the resin.

More specific examples of the phase inversion method and acid precipitation method include those described in JP-A Nos. 9-151342 and 10-140065.

The resin-coated pigment particles can be obtained by a process for obtaining the specific water-insoluble resin as aqueous dispersion, specifically by a production process for preparing dispersion of resin-coated pigment particles which comprises the following step (1) and step (2). In addition, the production of the aqueous inkjet recording ink according to the invention can be preferably carried out by the above production process and by a method in which the obtained dispersion comprising the resin-coated pigment particles is mixed with water and an organic solvent to give aqueous ink.

Step (1): A mixture containing the specific water-insoluble resin, the organic solvent, the neutralizing agent, the pigment and water described in the above is dispersed by stirring, etc. to obtain dispersion.

Step (2): The organic solvent is removed from the dispersion.

Method for stirring is not specifically limited. A mixing and stirring apparatus that is generally used, or if necessary, a disperser such as an ultrasonic disperser, high pressure homogenizer and bead mill can be used.

Preferred examples of an organic solvent include an alcohol solvent, a ketone solvent and an ether solvent.

Examples of the alcohol solvent include isopropyl alcohol, n-butanol, t-butanol, ethanol and the like. Examples of the ketone solvent include acetone, methylethyl ketone, diethyl ketone, methylisobutyl ketone and the like. Examples of the ether solvent include dibutyl ether, dioxane and the like. Among these solvents, ketone solvent such as methylethyl ketone and alcohol solvent such as isopropyl alcohol are preferred. Methylethyl ketone is most preferred.

The neutralizing gent is used to neutralize part of or the whole dissociating groups and to form an emulsified or a dispersed state in which the specific water-insoluble resin is stabilized in water. When the specific water-insoluble resin has an anionic dissociating group as a dissociating group, a neutralizing agent which can be used may be a basic compound such as an organic amine compound, ammonia, and a hydroxide of an alkaline metal. Examples of the organic amine compound include monomethyl amine, dimethyl amine, trimethyl amine, monoethyl amine, diethyl amine, triethyl amine, monopropyl amine, dipropyl amine, monoethanol amine, diethanol amine, triethanol amine, N,N-dimethyl-ethanol amine, N,N-diethyl-ethanol amine, 2-dimethylamino-2-methyl-1-propanol, 2-amino-2-methyl-1-propanol, N-methyldiethanol amine, N-ethyldiethanol amine, monoisopropanol amine, diisopropanol amine, triisopropanol amine and the like. Examples of the hydroxide of an alkali metal include lithium hydroxide, sodium hydroxide, potassium hydroxide and the like. Among them, in terms of dispersion stability in water, sodium hydroxide, potassium hydroxide, triethyl amine, and triethanol amine are preferred. In particular, sodium hydroxide and potassium hydroxide are more preferred.

Content of the basic compound is preferably in the range of 5 to 120 mol %, more preferably in the range of 10 to 120 mol % and still more preferably in the range of 80 to 120 mol % relative to 100 mol % of a dissociating group. When the content is 5 mol % or more, it is effective for obtaining dispersion stability in water. In addition, when the content is 120 mol % or less, it is effective for reducing the water-soluble components.

In the step (2), the organic solvent is distilled off from the dispersion obtained in the step (1) by reduced-pressure distillation, etc. and phase inversion to an aqueous system is carried out, and as a result, dispersion of resin-coated pigment particles in which the surfaces of the pigment particles are coated with the water-insoluble resin can be obtained. In the obtained dispersion, the organic solvent is substantially removed and the amount of the organic solvent is preferably 0.2% by mass or less, and more preferably 0.1% by mass or less.

More specifically, the aqueous inkjet recording ink can be produced by the steps of (1) mixing a solution in which the specific water-insoluble resin having an anionic group of the invention is dissolved in an organic solvent, a basic compound (i.e., neutralizing agent), and water for neutralization, (2) obtaining a suspension by mixing the resulting mixture and a pigment, and dispersing the pigment using a disperser, etc. to obtain a pigment dispersion, and (3) coating the pigment with a specific water-insoluble resin having an anionic group by removing the organic solvent, for example by distillation, and dispersing the resulting mixture in an aqueous medium to obtain aqueous dispersion.

In addition, more specifically, those disclosed in JP-A Nos. 11-2096722 and 11-172180 can be referenced.

Average particle diameter of the resin-coated pigment particles that is contained in aqueous inkjet recording ink of the invention is preferably in the range of 10 to 400 nm, more preferably in the range of 10 to 200 nm, and particularly more preferably in the range of 50 to 150 nm. When the average particle diameter is 10 nm or more, the producibility is improved, and when the average particle diameter is 400nm or less, the storage stability is improved. In addition, the particle diameter distribution of the resin-coated pigment particles is not specifically limited, and any one having a broad particle diameter distribution or a monodispersed particle diameter distribution can be used.

The particle diameter and the particle diameter distribution of the resin-coated pigment particles are obtained by measuring the volume average diameter according to dynamic light scattering method using nanotrack particle size analyzer UPA-EX150 (manufactured by Nikkiso Corp.).

As described in the above, the specific water-insoluble resin satisfying the condition A does not cause any precipitation in a mixed phase comprising an organic solvent and water, and forms fine emulsion having a size of 100 nm or less while it is under mixing process such as stirring, but the organic phase and the aqueous phase start to separate from each other immediately after the mixing process is stopped. The specific water-insoluble resin has a property that most of the resin dispersant not dissolved in water is separated together with the organic phase from the aqueous phase instead of being precipitated in the aqueous phase. By dispersing a pigment with such a resin, a pigment ink having excellent dispersion stability can be obtained. In this case, since the specific water-insoluble resin forms a soft micelle in an emulsified state, the resin can be easily adsorbed on the surface of the pigment during the mixing (dispersing) process and as a result, dispersion having excellent dispersion stability can be obtained.

In the invention, the dispersing treatment can be carried out by using, for example, ball mill, roll mill, bead mill, high pressure homogenizer, high speed stirring type disperser, ultrasonic homogenizer and the like.

The content of the resin-coated pigment particles which comprise pigment particles coated with the specific water-insoluble resin is, in terms of the dispersion stability and the concentration of the aqueous inkjet recording ink, preferably 1 to 10% by mass, more preferably 2 to 8% by mass and particularly preferably, 2 to 6% by mass, in the aqueous inkjet recording ink.

—Water-Soluble Organic Solvent—

The aqueous inkjet recording ink of the invention comprises at least one water-soluble organic solvent which has at least one hydroxy group. The water-soluble organic solvent is employed as an anti-drying agent, a humectant or a penetration promoting agent. Anti-drying agent is used for preventing clogging caused by aggregate formed by adhering and drying of ink at ejection opening of the ejection nozzle. As an anti-drying agent or a humectant, a water-soluble organic solvent having lower vapor pressure compared to water is preferred. In addition, a penetration promoting agent is employed in order to increase the penetration ability of the ink to paper.

In terms of compatibility with water and the function as an anti-drying agent, a humectant and a penetration promoting agent, the water-soluble organic solvent that is contained in the aqueous inkjet recording ink of the invention can be selected appropriately from known water-soluble organic solvents which comprise at least one hydroxy group.

Examples of the water-soluble organic solvent include glycerin, 1,2,6-hexanetriol, trimethylol propane, alkyleneglycols (for example, ethylene glycol, propylene glycol, diethylene glycol, triethylene glycol, tetraethylene glycol, pentaethylene glycol, dipropylene glycol), alkanediols(2-butene-1,4-diol, 2-ethyl-1,3-hexane diol, 2-methyl-2,4-pentane diol, 1,2-octane diol, 1,2-hexane diol, 1,2-pentane diol, 4-methyl-1,2-pentane diol and the like; polyhydric alcohols); sugars such as glucose, mannose, fructose, ribose, xylose, arabinose, galactose, aldonic acid, glucitol, maltose, cellobiose, lactose, sucrose, trehalose, maltotriose; sugar alcohols; hyaluronic acids; so called solid humectants including ureas and the like; alkyl alcohols having 1 to 4 carbon atoms such as ethanol, methanol, butanol, propanol, isopropanol; glycol ethers such as ethylene glycolmonomethyl ether, ethylene glycolmonoethyl ether, ethylene glycolmonobutyl ether, ethylene glycolmonomethyl ether acetate, diethylene glycolmonomethyl ether, diethylene glycolmonoethyl ether, diethylene glycol-mono-n-propyl ether, ethylene glycolmono-iso-propyl ether, diethylene glycolmono-iso-propyl ether, ethylene glycolmono-n-butyl ether, ethylene glycolmono-t-butyl ether, diethylene glycolmono-t-butyl ether, propylene glycolmonomethyl ether, propylene glycolmonoethyl ether, propylene glycolmono-t-butyl ether, propylene glycolmono-n-propyl ether, propylene glycolmono-iso-propyl ether, dipropylene glycolmonomethyl ether, dipropylene glycolmonoethyl ether, dipropylene glycolmono-n-propyl ether, dipropylene glycolmono-iso-propyl ether; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, sulforane and the like, and; glycerin alkyl ether derivatives that are represented by the following formula (II). These can be used alone or in combination of two or more.

$$R\text{-}(A)_n\text{-}OH \qquad \text{Formula (II)}$$

[R: a group derived from glycerin, A: ethyleneoxy group or propyleneoxy group, n=7 to 55]

As an anti-drying agent or a humectant, polyhydric alcohols are useful. Examples thereof include glycerin, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol, 1,5-pentane diol, tetraethylene glycol, 1,6-hexane diol, 2-methyl-2,4-pentane diol, polyethylene glycol, 1,2,4-butanetriol, 1,2,6-hexanetriol and the like. These can be used alone or in combination of two or more.

As a penetration agent, polyol compounds such as aliphatic diols are preferred. Examples of the aliphatic diols include 2-ethyl-2-methyl-1,3-propane diol, 3,3-dimethyl-1,2-butane diol, 2,2-diethyl-1,3-propane diol, 2-methyl-2-propyl-1,3- propane diol, 2,4-dimethyl-2,4-pentane diol, 2,5-dimethyl-2,5-hexane diol, 5-hexene-1,2-diol, 2-ethyl-1,3-hexane diol and the like. Among them, preferred examples include 2-ethyl-1,3-hexane diol and 2,2,4-trimethyl-1,3-pentane diol.

Among those described in the above, as a water-soluble organic solvent, glycerin, alkylene glycols, glycol ethers or glycerin alkyl ether derivatives or a mixture of two or more of them are preferred in terms of dispersion stability.

The water-soluble organic solvent can be used alone or in combination of two or more. Content of the water-soluble organic solvent having at least one hydroxy group is preferably 15% by mass or more, and more preferably 15 to 40% by mass in the aqueous inkjet recording ink.

—Surfactant—

The aqueous inkjet recording ink of the invention preferably comprises at least one surfactant. The surfactant is employed as an agent for controlling surface tension, and examples thereof include a non-ionic, a cationic, an anionic and a betaine type surfactant.

To achieve good application of ink droplets with an inkjet method, the surfactant is preferably contained in an amount which can control the surface tension of the aqueous inkjet recording ink to be in the range of 20 to 60 mN/m. Especially, an amount which can control the surface tension to be in the range of 20 to 45 mN/m is preferred. An amount which can control the surface tension to be in the range of 25 to 40 mN/m is more preferred.

As the surfactant, a compound which has a structure comprising both hydrophilic part and hydrophobic part in the molecule can be effectively used. Further, any of an anionic surfactant, a cationic surfactant, an amphoteric surfactant, and a non-ionic surfactant can be used.

Specific examples of an anionic surfactant include sodium dodecylbenzene sulfonate, sodium lauryl sulfate, sodium alkyldiphenyl ether disulfonate, sodium alkylnaphthalene sulfonate, sodium dialkylsulfosuccinate, sodium stearate, potassium oleate, sodium dioctylsulfosuccinate, sodium polyoxyethylenealkyl ether sulfate, sodium polyoxyethylenealkyl ether sulfate, sodium polyoxyethylenealkylphenyl ether sulfate, sodium dialkyl sulfosuccinate, sodium stearate, sodium oleate, sodium t-octylphenoxyethoxypolyethoxyethyl sulfate, and the like. They can be used alone or in combination of two or more.

Specific examples of a non-ionic surfactant include polyoxyethylenelauryl ether, polyoxyethyleneoctylphenyl ether, polyoxyethyleneoleylphenyl ether, polyoxyethylenenonylphenyl ether, oxyethylene/oxypropylene block copolymer, t-octylphenoxyethylpolyethoxy ethanol, nonylphenoxyethylpolyethoxy ethanol and the like. They can be used alone or in combination of two or more.

Examples of a cationic surfactant include tetraalkyl ammonium salt, alkyl amine salt, benzalkonium salt, alkyl pyridium salt, imidazolium salt, and the like. Specifically, dihydroxy ethylstearyl amine, 2-heptadecenyl-hydroxyethyl imidazoline, lauryl dimethylbenzyl ammonium chloride, cetylpyridinium chloride, stearamide methylpyridum chloride and the like can be mentioned.

Content of the surfactant in the aqueous inkjet recording ink is not specifically limited. It is preferably 1% by mass or more, more preferably 1 to 10% by mass, and still more preferably 1 to 3% by mass.

—Other Components—

The aqueous inkjet recording ink of the invention may comprise, in addition to the above components, other components such as a UV absorbing agent, a fade preventing agent, a mildewcide, a pH controlling agent, an anti-corrosive agent, an anti-oxidant, an emulsification stabilizer, a preservative, an anti-foaming agent, a viscosity controlling agent, a dispersion stabilizer, a chelating agent and the like, if necessary.

Examples of the UV absorbing agent include benzophenone type UV absorbing agent, benzotriazole type UV absorbing agent, salicylate type UV absorbing agent, cyanoacrylate type UV absorbing agent, nickel complex salt type UV absorbing agent, and the like.

As the fade preventing agent, various types of organic or metal complex fade preventing agent can be used. Examples of the organic fade preventing agent include hydroquinones, alkoxypheonols, dialkoxyphenols, phenols, anilines, amines, indanes, chromanes, alkoxyanilines, heterocycles and the like. Examples of the metal complex include a nickel complex, a zinc complex and the like.

As the mildewcide, sodium dehydroacetate, sodium benzoate, sodium pyridinethion-1-oxide, p-hydroxybenzoic acid ethyl ester, 1,2-benzisothiazolin-3-one, sodium sorbate, sodium pentachlorophenolate and the like can be mentioned. The mildewcide is preferably used in an amount of 0.02 to 1.00% by mass in the ink.

The pH controlling agent is not specifically limited as long as it does not have a negative effect on ink to be produced and can adjust the pH to desired value. It can be appropriately selected according to the purpose of use.

Examples of the pH controlling agent include alcohol amines (for example, diethanol amine, triethanol amine, 2-amino-2-ethyl-1,3-propane diol and the like), alkali metal hydroxides (for example, lithium hydroxide, sodium hydroxide, potassium hydroxide and the like), ammonium hydroxides (for example, ammonium hydroxide and quaternary ammonium hydroxide), phosphonium hydroxides, alkali metal carbonates and the like.

Examples of the anti-corrosive agent include acidic sulfte, sodium thiosulfate, ammonium thiodiglycolate, diisopropyl ammonium nitrite, pentaerythritol tetranitrate, dicyclohexyl ammonium nitrite and the like.

Examples of the anti-oxidant include phenol type anti-oxidant (including a hindered phenol type anti-oxidant), amine type anti-oxidant, sulfur type anti-oxidant, phosphorous type anti-oxidant and the like.

Examples of the chelating agent include sodium ethylenediamine tetraacetate, sodium nitrilotriacetate, sodium hydroxy ethylethylenediamine triacetate, sodium diethylene triamine pentaacetate, and sodium uramyldiacetate and the like.

—Physical Properties of Aqueous Ink—

Surface tension of the aqueous inkjet recording ink according to the invention (at 25° C.) is preferably 20 mN/m or more but 60 mN/m or less. More preferably, it is 20 mN/m or more but 45 mN/m or less. Still more preferably, it is 25 mN/m or more but 40 mN/m or less.

The surface tension is measured by using Automatic Surface Tensiometer CBVP-Z (manufactured by Kyowa Interface Science Corp.) under the condition of testing the aqueous ink at 25° C.

In addition, the viscosity of the aqueous inkjet recording ink according to the invention at 20° C. is preferably 1.2 mPa·s or more but 15.0 mPa·s or less, more preferably 2 mPa·s or more but less than 13 mPa·s, and still more preferably 2.5 mPa·s or more but less than 10 mPa·s.

The viscosity is measured by using VISCOMETER TV-22 (manufactured by TOKI SANGYO CO. LTD) under the condition of testing the aqueous ink at 20° C.

The aqueous inkjet recording ink according to the invention can be used for forming a color image having multiple colors (e.g., full color image). For forming a full color image, ink having magenta hue, ink having cyan hue, and ink having yellow hue can be used. Further, in order to adjust the hue, ink having black hue can be used.

Still further, in addition to the hues including yellow (Y), magenta (M), and cyan (C), inks having other hues such as red (R), green (G), blue (B), white (W) or ink having a so called specific color in a printing field can be used.

The ink having each hue can be prepared by freely modifying the color of the pigment that is used as a colorant.

The aqueous inkjet recording ink according to the invention can be used for image recording based on an inkjet method. Specifically, the aqueous inkjet recording ink is ejected with an energy supply and a colored image can be formed on a desired medium to be recorded, such as plain paper, resin-coated paper, for example paper for inkjet recording described in publications of JP-A Nos. 8-169172, 8-27693, 2-276670, 7-276789, 9-323475, 62-238783, 10-153989, 10-217473, 10-235995, 10-337947, 10-217597, 10-337947, a film, a paper for electrophotography, cloth, glass, a metal, a porcelain, and the like. In addition, as a method for inkjet recording preferred for the invention, those disclosed in the paragraph Nos. 0093-0105 of JP-A No. 2003-306623 can be used.

The inkjet method is not specifically limited and can be any of the known methods such as a charge control method which comprises ejecting ink using an electrostatic attraction force, drop on demand method (i.e., pressure pulse method) which comprises using vibration pressure of a piezoelectric element, a sonic inkjet method which comprises ejecting ink by using radiation pressure wherein the electric signal is converted into a sonic beam and radiated to ink, or a thermal inkjet method (registered trademark; Bubblejet) which comprises forming air bubbles by heating ink and using the pressure generated therefrom. As the inkjet method, the method which has been disclosed in JP-A No. 54-59936 and which comprises introducing a drastic volume change in ink by the action of heat energy, and ejecting ink from a nozzle based on the working power generated from the change, can be effectively used.

In addition, examples of the inkjet method include a method which comprises ejecting many small volume ink with low concentration (so called, photoink), a method which comprises improving the quality of image by using multiple inks having the same color but with different concentration, or a method which comprises using a colorless and transparent ink.

In addition, the inkjet head that is used for the inkjet method can be either on demand type or a continuous type. Further, specific examples of the ejecting method include electromechanical transducer type (for example, single cavity type, double cavity type, bender type, piston type, share mode type, shared wall type and the like), electrothermal transducer type (for example, thermal inkjet type, Bubblejet type (registered trademark)), an electrostatic suction type (for example, electric field control type, slit jet type and the like) and a discharge type (for example, a spark jet type and the like) and the like. Any of these ejection methods can be used.

Still further, the ink nozzle which can be used for recording according to the inkjet method is not specifically limited. Rather, depending on the purpose of use, it can be appropriately selected.

According to the present invention, the following embodiments <1> to <9> are provided.

<1> An aqueous inkjet recording ink comprising pigment particles coated with a water-insoluble resin, water, and a water-soluble organic solvent comprising at least one hydroxy group, wherein the water-insoluble resin has a salt-forming group and a structural unit which is derived from a methacrylate and has an aromatic ring linked via a linking group to an atom in the main chain of the water-insoluble resin, and the water-insoluble resin satisfies the condition that when the water-insoluble resin, an organic solvent, one equivalent of a neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent.

<2> The aqueous inkjet recording ink according to <1>, wherein the resin-coated pigment particles are produced by mixing and dispersing the water-insoluble resin, the organic solvent, the neutralizing agent, the pigment and water, and removing the organic solvent from the obtained dispersion.

<3> The aqueous inkjet recording ink according to <1>, wherein the water-insoluble resin comprises hydrophilic structural units (a) and hydrophobic structural units (b), and the ratio of the hydrophilic structural units (a) is 15% by mass or less with respect to the total mass of the water-insoluble resin, the hydrophilic structural units (a) comprise at least a structural unit derived from a (meth)acrylic acid, and the hydrophobic structural units (b) comprise at least one selected from a structural unit derived from benzyl methacrylate and a structural unit derived from phenoxyethyl methacrylate in a total amount of 40% by mass or more with respect to the total mass of the water-insoluble resin, and a structural unit derived from a C1 to C4 alkyl(meth)acrylate in an amount of 15% by mass or more with respect to the total mass of the water-insoluble resin.

<4> The aqueous inkjet recording ink according to <1>, wherein the water-insoluble resin has a weight average molecular weight of 30,000 or more.

<5> The aqueous inkjet recording ink according to <1>, wherein the acid number of the water-insoluble resin is 30 mgKOH/g or more but 100 mgKOH/g or less.

<6> The aqueous inkjet recording ink according to <1>, wherein the content of the water-soluble organic solvent is 15% by mass or more.

<7> The aqueous inkjet recording ink according to <6>, wherein the water-soluble organic solvent is at least one selected from glycerin, alkylene glycols, glycol ethers, and glycerin alkyl ether derivatives.

<8> The aqueous inkjet recording ink according to <1>, further comprising at least one surfactant.

<9> A method for producing an aqueous inkjet recording ink, comprising mixing and dispersing a water-insoluble resin, an organic solvent, a neutralizing agent, a pigment, and water, the water-insoluble resin having a salt-forming group and a structural unit which is derived from a methacrylate and has an aromatic ring linked via a linking group to an atom in the main chain of the water-insoluble resin;

removing the organic solvent from the resulting dispersion to prepare a dispersion of resin-coated pigment particles in which the surfaces of the pigment particles are coated with the water-insoluble resin; and preparing an aqueous ink by using the dispersion of the resin-coated pigment particles, water, and a water-soluble organic solvent comprising at least one hydroxy group, wherein the water-insoluble resin satisfies the condition that when the water-insoluble resin, the organic solvent, one equivalent of the neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent.

Therefore, according to the invention, an aqueous inkjet recording ink which has excellent dispersion stability and a small dispersion diameter of the pigment, and a method of producing an aqueous inkjet recording ink in which the pigment can be finely and stably dispersed can be provided.

EXAMPLES

Herein below, the present invention is explained in greater detail in view of the following Examples, but is not limited to the following Examples. In addition, unless specifically mentioned otherwise, the term "part" is based on mass.

—Synthesis of Resin Dispersant P-1—

To a 1,000 ml three-neck flask equipped with a stirrer and a condenser, 88 g of methylethyli ketone was added and heated at 72° C. under nitrogen atmosphere. To the mixture, a solution containing 0.85 g of dimethyl-2,2'-azobisisobutyrate, 50 g of phenoxyethyl methacrylate, 12 g of methacrylic acid and 38 g of ethyl methacrylate dissolved in 50 g of methylethyl ketone was added dropwise over three hours. Upon the completion of the dropwise addition, the reaction was allowed to proceed for one more hour and a solution containing 0.42 g of dimethyl-2,2'-azobisisobutyrate dissolved in 2 g of methylethyl ketone was added. The temperature was raised to 78° C. and the mixture was heated for four hours. The resulting reaction solution was re-precipitated twice in an excess amount of hexane, and the precipitated resin was dried to obtain a copolymer of phenoxy ethyl methacrylate/ethyl methacrylate/methacrylic acid (copolymerization ratio [molar ratio]=50/38/12; resin dispersant P-1) (96.3 g).

The composition of the obtained resin dispersant P-1 was confirmed with $^1$H-NMR, and the weight average molecular weight (Mw) that had been obtained from GPC was 48,500. In addition, according to the method prescribed in the JIS Standard (JIS K 0070:1992), the acid number of the polymer was found to be 78.24 mgKOH/g.

<Mixing Test>

The resin dispersant P-1 obtained in the above (5.36 g) and methylethyl ketone (47.14 g, organic solvent) were mixed with each other. To the resulting mixture, an aqueous solution in which 0.30 g of sodium hydroxide (one equivalent of the carboxylic group contained in the resin dispersant P-1) had been dissolved in 97.20 g of water was added, and stirred (apparatus; a stirring apparatus equipped with stirring wing, revolution number 200 rpm, at 25° C. for 30 minutes) so that the total amount of the resin dispersant P-1 and methylethyl ketone (organic solvent) is 35% by mass of the total mass of the mixture. In this case, observation and evaluation were carried out with the naked eye on whether an emulsion was formed without precipitation of the resin dispersant P-1, and after the emulsion was allowed to stand for three hours, a transparent single phase was formed, or two separate phases were formed and the aqueous phase thereof was transparent. The transparency of an aqueous phase was determined by adding the aqueous phase to a quartz cell (width 1 cm), and measuring the transmittance at 400nm-800nm using a spectrophotometer (V-570 type spectrophotometer, manufactured by Japan Spectroscopic Co.). Average transmittance of 85% or more was determined to be transparent.

For the evaluation, when no white cloudy phase was formed upon mixing, and a transparent single phase was formed, or two phases were formed and the aqueous phase thereof was transparent, after being allowed to stand for a while, it was marked "A". When a white cloudy phase was formed upon mixing, it was marked "B". The results are summarized in the Table 1 below.

—Synthesis of Resin Dispersants P-2 to P-10—

The resin dispersants P-2 to P-10 were synthesized in almost the same manner as in the synthesis of the resin dispersant P-1, except that 50 g of phenoxyethyl methacrylate, 12 g of methacrylic acid and 38 g of ethyl methacrylate were changed to the monomers described in the following Table 1. In addition, in the same manner as the resin dispersant P-1, the mixing test was carried out and the evaluation results are summarized in the following Table 1.

Example 1

—Preparation of Dispersion of Resin-Coated Pigment Particles—

10 parts of Pigment Blue 15:3 (phthalocyanine blue A220, manufactured by Dainichiseika Corp.), 5 parts of phenoxy ethyl methacrylate/ethyl methacrylate/methacrylic acid copolymer (resin dispersant P-1), 42 parts of methylethyl ketone, and 5.5 parts of 1N aqueous NaOH solution, and 87.2 parts of ion exchange water were mixed with each other and then dispersed for 2 to 6 hours using 0.1 mmφ zirconia beads by a bead mill.

By removing methyl ethyl ketone at 55° C. by subjecting thus obtained dispersion to reduced pressure, and by partially removing water, a dispersion of resin-coated pigment particles wherein the pigment is contained in a concentration of 10.2% by mass was obtained.

—Preparation of Aqueous Ink—

Next, using the obtained dispersion of the resin-coated pigment particles, and mixing the components having the composition as describe below, aqueous ink was prepared.

| | |
|---|---:|
| The above dispersion of the resin-coated pigment particles | 37.2 parts |
| Sunnix GP 250 (manufactured by Sanyo Kasei Kogyo Corp.) | 10 parts |
| Diethylene glycolmonoethyl ether | 5 parts |
| Olfin E 1010 (manufactured by Nissan Kagaku Kogyo Corp.) | 1 part |
| Ion exchange water | 46.8 parts |

—Evaluation—

The obtained aqueous ink was evaluated as described below. The evaluation results are summarized in the following Table 1.

<1. Volume Average Particle Diameter>

The volume average particle diameter of the obtained aqueous ink was measured based on a dynamic light scattering method using nanotrack particle size distribution analyzer UPA-EX150 (manufactured by Nikkiso Corp.). The measurement was carried out at 25° C. using a test sample which had been prepared by adding 10 ml of ion exchange water to 10 μl of aqueous ink.

<2. Dispersion Stability>

The particle diameter of the aqueous ink right immediately after its preparation, i.e., $a^1$, was determined with the same method as described for the above "1. Volume average particle diameter." In addition, the viscosity $b^1$ and the number of coarse particles were measured using the following methods. After the measurement, the aqueous ink was stored in an incubator of 60° C. for 14 days, and the particle diameter after the storage ($a^2$) and the viscosity ($b^2$) were also measured. Further, the number of coarse particles having a size of 5 μm or more contained in the ink after the storage was counted. Still further, from thus obtained particle diameter and the viscosity, the change in particle diameter ($|a^2-a^1|$; μm) and the change in viscosity ($|b^2-b^1|/b^1 \times 100$; %) between before and after the storage were obtained and then evaluated according to the evaluation criteria described below. In this regard, the symbol "||" indicates an absolute value.

—Measurement of Viscosity—

By using VISCOMETER TV-22 (manufactured by TOKI SANGYO CO. LTD.), the viscosity of the aqueous ink was measured at temperature condition of 25° C.

—Measurement of the Number of Coarse Particle—

By using a flow type particle image analyzer FPIA3000 (manufactured by Sysmex Corporation), the number of the coarse particles having a size of 5 μm or more contained in the aqueous ink was determined. The measurement was carried out at 25° C. using a test sample which had been prepared by adding 1.8 ml of ion exchange water to 0.2 ml of aqueous ink. From the obtained results, the number of the coarse particles having a size of 5 μm or more contained in the aqueous ink (1 μl) was calculated.

—Evaluation Criteria—

A: Change in particle diameter was 10 nm or less, change in viscosity was 10% or less, and number of coarse particles having a size of 5 μm or more was 50 or less.

B: One of the following conditions was met—change in particle diameter was more than 10 nm, change in viscosity was more than 10%, and number of coarse particles having a size of 5 μm or more was more than 50.

C: Two or more of the following conditions were met—change in particle diameter was more than 10 nm, change in viscosity was more than 10%, and number of coarse particles having a size of 5 μm or more was more than 50.

Examples 2 to 6, Comparative Examples 1 to 4

Except that the resin dispersant P-1 is changed to the resin dispersant as described in the following Table 1, aqueous ink was prepared in the same manner as in Example 1 and evaluated similarly. The evaluation results are summarized in the following Table 1.

TABLE 1

| | | Copolymerization components and polymerization ratio of resin dispersant (unit: part) | | | | | | | |
|---|---|---|---|---|---|---|---|---|---|
| | | Phenoxy ethyl methacrylate | Benzyl methacrylate | Styrene | Ethyl hexyl methacrylate | Hexyl methacrylate | Methyl methacrylate | Ethyl methacrylate | Methacrylic acid |
| Example 1 | P-1 | 50 | | | | | | 38 | 12 |
| Example 2 | P-2 | 70 | | | | | 23 | | 7 |
| Example 3 | P-3 | 70 | | | | | 20 | | 10 |
| Example 4 | P-4 | 50 | | | | | 40 | | 10 |
| Example 5 | P-5 | | 90 | | | | | | 10 |
| Example 6 | P-6 | | 70 | | | | 20 | | 10 |
| Comparative example 1 | P-7 | | | | 90 | | | | 10 |
| Comparative example 2 | P-8 | | | | | 90 | | | 10 |
| Comparative example 3 | P-9 | | | 90 | | | | | 10 |
| Comparative example 4 | P-10 | | | 60 | | | 30 | | 10 |

| | | Properties of resin dispersant | | | | Volume average particle diameter of the pigment particles [μm] | Dispersion stability |
|---|---|---|---|---|---|---|---|
| | | Methacrylate having an aromatic ring via a linking group | Acid number [mgKOH/g] | Mw | Mixing test | | |
| Example 1 | P-1 | contained | 78.24 | 48500 | A | 110.1 | A |
| Example 2 | P-2 | contained | 45.64 | 41500 | A | 94.2 | A |
| Example 3 | P-3 | contained | 65.2 | 43200 | A | 90.7 | A |
| Example 4 | P-4 | contained | 65.2 | 45600 | A | 106 | A |
| Example 5 | P-5 | contained | 65.2 | 39500 | A | 108 | B |
| Example 6 | P-6 | contained | 65.2 | 41300 | A | 95.5 | B |
| Comparative example 1 | P-7 | not contained | 65.2 | 43300 | B | 791 | — |
| Comparative example 2 | P-8 | not contained | 65.2 | 42500 | A | 361.4 | — |
| Comparative example 3 | P-9 | not contained | 65.2 | 38500 | B | 132 | C |
| Comparative example 4 | P-10 | not contained | 65.2 | 41200 | B | 128 | C |

As described in the Table 1, in the Examples, the pigment particles were dispersed in a form of fine particles, and dispersion stability was good. On the other hand, in the Comparative Examples 1 and 2, the pigment particles were not finely dispersed. In the Comparative examples 3 and 4, although the pigment particles were finely dispersed to some degree, favorable dispersion stability could not be obtained.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous inkjet recording ink comprising pigment particles coated with a water-insoluble resin, water, and a water-soluble organic solvent comprising at least one hydroxy group, wherein
    the water-insoluble resin has a salt-forming group and a structural unit which is derived from a methacrylate and has an aromatic ring linked via a linking group to an atom in the main chain of the water-insoluble resin, the structural unit being from 40% to less than 75% by mass relative to the total mass of the water-insoluble resin;
    the water-insoluble resin satisfies the condition that when the water-insoluble resin in an amount of 5.36 g, an organic solvent that is 47.14 g of methylethylketone, one equivalent of a neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent; and
    the term transparent means a property in which the amount of light that has passed through an aqueous phase having a thickness of 1 cm is at least 85% of the amount of the incident light.

2. The aqueous inkjet recording ink according to claim 1, wherein the resin-coated pigment particles are produced by mixing and dispersing the water-insoluble resin, the organic solvent, the neutralizing agent, the pigment and water, and removing the organic solvent from the obtained dispersion.

3. The aqueous inkjet recording ink according to claim 1, wherein
    the water-insoluble resin comprises hydrophilic structural units (a) and hydrophobic structural units (b), and the ratio of the hydrophilic structural units (a) is 15% by mass or less with respect to the total mass of the water-insoluble resin,
    the hydrophilic structural units (a) comprise at least a structural unit derived from a (meth)acrylic acid, and
    the hydrophobic structural units (b) comprise at least one selected from a structural unit derived from benzyl methacrylate and a structural unit derived from phenoxyethyl methacrylate in a total amount of 40% by mass or more with respect to the total mass of the water-insoluble resin, and a structural unit derived from a C1 to C4 alkyl(meth)acrylate in an amount of 15% by mass or more with respect to the total mass of the water-insoluble resin.

4. The aqueous inkjet recording ink according to claim 1, wherein the water-insoluble resin has a weight average molecular weight of 30,000 or more.

5. The aqueous inkjet recording ink according to claim 1, wherein the acid number of the water-insoluble resin is 30 mgKOH/g or more but 100 mgKOH/g or less.

6. The aqueous inkjet recording ink according to claim 1, wherein the content of the water-soluble organic solvent is 15% by mass or more.

7. The aqueous inkjet recording ink according to claim 6, wherein the water-soluble organic solvent is at least one selected from glycerin, alkylene glycols, glycol ethers, and glycerin alkyl ether compounds.

8. The aqueous inkjet recording ink according to claim 1, further comprising at least one surfactant.

9. A method for producing an aqueous inkjet recording ink, comprising
    mixing and dispersing a water-insoluble resin, an organic solvent, a neutralizing agent, a pigment, and water, the water-insoluble resin having a salt-forming group and a structural unit which is derived from a methacrylate and has an aromatic ring linked via a linking group to an atom in the main chain of the water-insoluble resin, the structural unit being from 40% to less than 75% by mass relative to the total mass of the water-insoluble resin;
    removing the organic solvent from the resulting dispersion to prepare a dispersion of resin-coated pigment particles in which the surfaces of the pigment particles are coated with the water-insoluble resin; and
    preparing an aqueous ink by using the dispersion of the resin-coated pigment particles, water, and a water-soluble organic solvent comprising at least one hydroxy group,
    wherein the water-insoluble resin satisfies the condition that when the water-insoluble resin in an amount of 5.36 g, the organic solvent that is 47.14 g of methylethylketone, one equivalent of the neutralizing agent with respect to the salt-forming group, and water are mixed with a total content of the water-insoluble resin and the organic solvent being 35% by mass relative to the total mass of the mixture, an emulsion is formed without precipitation of the water-insoluble resin, and after the emulsion is allowed to stand for three hours, a transparent single phase is formed, or two separate phases are formed and at least an aqueous phase of the two phases is transparent, and
    the term transparent means a property in which the amount of light that has passed through an aqueous phase having a thickness of 1 cm is at least 85% of the amount of the incident light.

10. An aqueous inkjet recording ink according to claim 1, wherein the structural unit which is derived from a methacrylate and has an aromatic ring linked via a linking group to an atom in the main chain of the water-insoluble resin is represented by Formula (I):

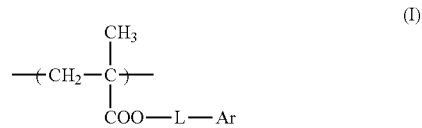

wherein L is a single bond or a divalent linking group having 1 to 30 carbon atoms and Ar represents a monovalent group derived from an aromatic ring.

11. A method for producing an aqueous inkjet recording ink according to claim 9, wherein
    the structural unit which is derived from a methacrylate and has an aromatic ring linked via a linking group to an atom in the main chain of the water-insoluble resin is represented by Formula (I):

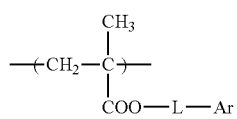
(I)
wherein L is a single bond or a divalent linking group having 1 to 30 carbon atoms and Ar represents a monovalent group derived from an aromatic ring.
* * * * *